Nov. 2, 1948.   W. H. OLNEY   2,452,785
TRAILER HITCH
Filed Oct. 17, 1945
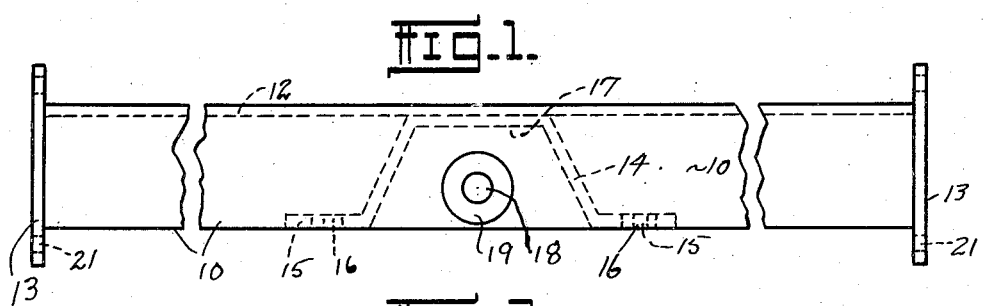
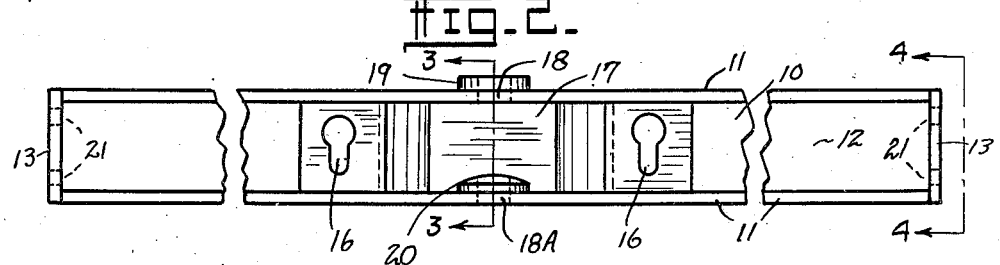
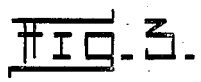 
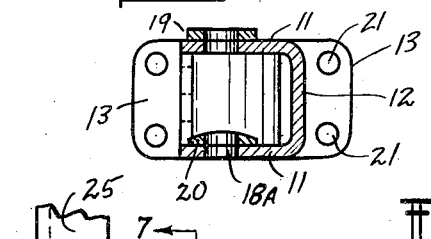 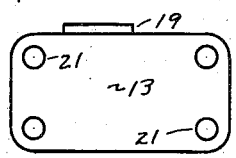
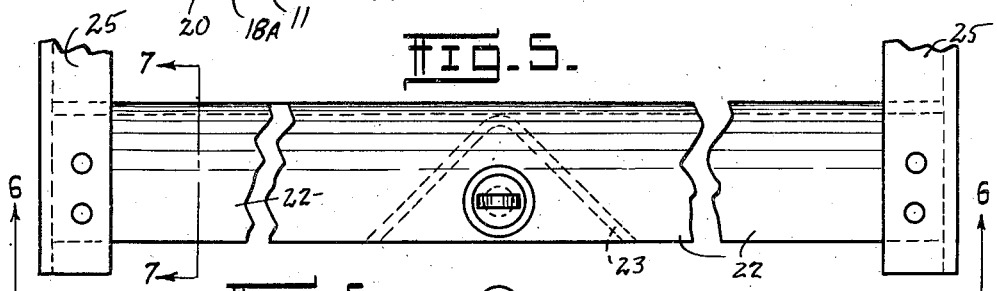
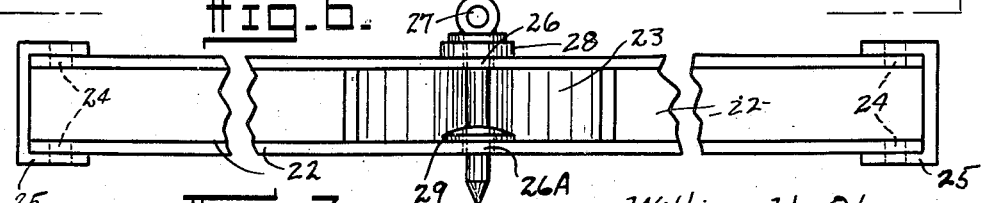
William H. Olney,
INVENTOR.
BY *W. B. Harpman*
ATTORNEY.

Patented Nov. 2, 1948

2,452,785

UNITED STATES PATENT OFFICE 2,452,785

TRAILER HITCH

William H. Olney, Youngstown, Ohio

Application October 17, 1945, Serial No. 622,907

6 Claims. (Cl. 280—33.44)

This invention relates to a trailer hitch and more particularly to a heavy duty trailer hitch for application to trucks.

The principal object of the invention is the provision of a heavy duty trailer hitch.

A further object of the invention is the provision of a trailer hitch which may be affixed to the frame members of a truck to provide strong structural connection with the frame to enable a heavy duty trailer such as is employed in hauling a power shovel and the like to be attached thereto.

A still further object of the invention is the provision of a trailer hitch incorporating means for affixing safety chains thereto.

A still further object of the invention is the provision of a trailer hitch incorporating means for controlling the trailer tongue movement with respect thereto.

A still further object of the invention is the provision of a trailer hitch incorporating means for guiding the trailer tongue connecting member thereinto.

The heavy duty trailer hitch disclosed herein has been devised to form a practical and efficient accessory for attachment to the rearmost portions of the frame of a truck to provide a suitable structural member and trailer hitch for towing heavy trailers such as used in transporting heavy excavating machinery and the like. It is well known that many trailer hitches have been devised which can be attached to a towing vehicle and provide some means of attaching a trailer thereto. It is also well known that most of the trailer hitches are commonly employed in towing relatively light weight trailers. In the excavating and heavy equipment hauling industries it is frequently necessary to employ a truck as a tractor in towing a heavy duty trailer load with a heavy power shovel or other excavating equipment. In the past it has been nessary to provide specially built truck frames capable of standing the severe strain of towing the heavy load. The present invention has been devised to form a structurally sound trailer hitch which may be readily affixed to a conventional truck frame and provide a suitable trailer hitch for such heavy duty towing.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 1 is a top plan view of the trailer hitch with parts broken away.

Figure 2 is a front elevation of the trailer hitch with parts broken away.

Figure 3 is a cross sectional elevation of the trailer hitch taken on line 3—3 of Figure 2.

Figure 4 is an end elevation of the trailer hitch taken on line 4—4 of Figure 2.

Figure 5 is a top plan view of a modified form of trailer hitch showing the same installed between the frame members of a truck.

Figure 6 is a front elevation of the trailer hitch illustrated in Figure 5 and taken on line 6—6 thereof.

Figure 7 is a cross sectional elevation of the trailer hitch taken on line 7—7 of Figure 5.

By referring to the drawings and Figures 1 and 2 in particular, it will be seen that the trailer hitch consists primarily of a length of U-shaped channeled stock 10, the flanges 11 of which lie on a horizontal plane and the connecting web 12 of which is positioned on a vertical plane. The ends of the channeled stock 10 are provided with end plates 13 and the center-most section is provided with a semi U-shaped guide 14, the outermost ends of the arms of which are formed as sidewardly extending flanges 15 and provided with key hole shaped slots 16 (see Figure 2) for the reception of safety chains. The semi U-shaped guide 14 serves a dual purpose in that it strengthens the center section of the channeled stock 10 and at the same time provides guide means for the tongue of the trailer to be hitched thereto. The rearmost section of the semi U-shaped guide, as is indicated in the drawings by the numeral 17, reinforces the vertical web 12 of the channeled stock 10 and guards the same against undue wear from the end of the trailer hitch. Openings disposed on the same vertical plane are provided in the flanges 11 and are indicated by the numerals 18 and 18A. In order that the flanges 11 adjacent the openings 18 and 18A may be protected from undue wear of the trailer tongue (not shown) which is adapted to be connected to the trailer hitch, washer-like members 19 and 20 are provided and are positioned on the top surfaces of each of the flanges 11 in registry with the openings 18 and 18A. The washer-like member 19 forms a bearing for the connection pin (not shown) which is inserted through the openings 18 and 18A and the end of the trailer tongue (not shown) in connecting the trailer tongue to the hitch. The washerlike member 20 is rounded on its uppermost surface to provide a suitable bearing surface for the end of the trailer tongue (not shown) which normally rests thereon. The trailer hitch is affixed to the end sections of the axially extending frame members of a truck frame by means of a plurality of openings formed in the end plates 13, which openings are indicated by the numerals 21 (see Figures 3 and 4). These plurality of openings 21 enable the trailer hitch to be bolted to the truck frame and it will be observed that they are of a sufficient size to suitably reinforce the end sections of the truck frame to which they are attached.

It will thus be seen that a simple and efficient heavy duty trailer hitch has been disclosed which is preferably formed of a plurality of metal members welded to one another and which trailer hitch may be preformed in several predetermined widths for installation as an accessory on truck frames for providing a heavy duty trailer hitch.

In Figures 5, 6 and 7 a modified form of the trailer hitch is disclosed in which a section of curved channel 22 is employed as the principal body member and a V-shaped guide 23 is positioned centrally therein, the end sections of which are provided with oppositely disposed openings 24 which permit the channel member 22 to be bolted directly to portions of the truck frame such as indicated by the numerals 25 in Figures 5, 6 and 7 of the drawings. The curved channel 22 in connection with the guide 23 positioned therein forms a pocket-like structure for the reception of a trailer hitch (not shown) and openings 26 and 26A are provided in the channel 22 on the same vertical plane so that a pin, such as shown at 27, may be positioned therethrough as in connecting a trailer hitch thereto. Washer-like members 28 and 29 are provided on the uppermost surfaces of the portions of the curved channel 22 to provide additional wear on the surface adjacent the openings 26 and 26A. It will thus be seen that a simple and efficient heavy duty trailer hitch has been disclosed which is of simpler construction than the hitch disclosed in Figures 1, 2, 3 and 4 of the drawings and heretofore described, and which trailer hitch may be installed on the rear section of a truck frame as by bolting the same therethrough with the openings provided and which will, in use, provide an adequate hitching structure for a heavy duty trailer.

Having thus described my invention, what I claim is:

1. A trailer hitch consisting of a channel member having end plates affixed thereto so as to enable the said hitch to be positioned between frame members of a truck and attached thereto, said hitch including a guide member positioned in the channel member and forming an area for the reception of a trailer tongue, openings formed in the said channel member within the area defined by the said guide member so as to provide for the insertion of a pin therethrough.

2. A trailer hitch consisting of a channel member having end plates affixed thereto, a semi U-shaped guide member positioned within the said channel centrally thereof and defining an area for the reception of a trailer tongue, openings formed in the said channel member within the area defined by the said guide member, washerlike members affixed to the said channel in registry with the said openings for reinforcing the said channel about the said opening.

3. A trailer hitch consisting of a channel member having end plates affixed thereto, a semi U-shaped guide member positioned within the said channel centrally thereof and defining an area for the reception of a trailer tongue, out-turned flanges formed on the said semi U-shaped guide member, slots formed in the said out-turned flanges for the reception of safety chains, openings formed in the said channel member on a vertical axis within the area defined by the said guide member so that a pin may be positioned therethrough in registry with a trailer tongue positioned in the said area defined by the said member.

4. A trailer hitch consisting of a section of channel stock adapted to be positioned between frame members of a truck and attached thereto, a semi U-shaped reinforcing member positioned centrally in said channel and defining an area in which a trailer tongue may be positioned, openings formed in the said channel on a vertical axis in the area defined by the said guide member so that a pin may be positioned therethrough in registry with a trailer tongue therein.

5. A heavy duty hitch for installation on a truck frame, the said hitch including a channeled body member and means on the ends thereof facilitating attachment to the said truck frame, guide means positioned centrally of the said channeled member for locating a trailer tongue, the said guide means including sections having slots formed therein for the reception of safety chains and openings formed in the said channel member for the reception of a pin engageable with the said trailer tongue.

6. In a trailer hitch formed of a section of channeled stock, means for locating a trailer tongue centrally thereof, said means consisting of a semi U-shaped guide disposed within the area of the said channeled stock and having sections thereon having slots therein forming means for connecting safety chains thereto, and openings in the said channeled stock having reinforcing members thereabout and affixed thereto.

WILLIAM H. OLNEY.

REFERENCES CITED

The following references are of record in the file of this patent:

UNITED STATES PATENTS

| Number | Name | Date |
|---|---|---|
| 1,384,944 | Flood | July 19, 1921 |
| 1,739,456 | Hansen | Dec. 10, 1929 |
| 2,097,006 | Weis | Oct. 26, 1937 |
| 2,208,579 | Haggerty | July 23, 1940 |